Dec. 12, 1950  C. A. BROOKS  2,533,916
LOCK WASHER
Filed Jan. 21, 1946
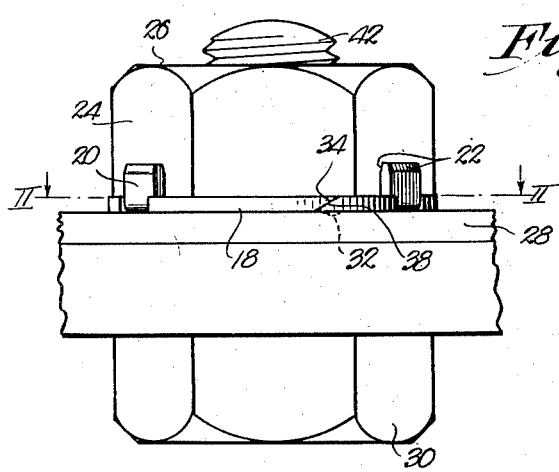
Fig. 1.
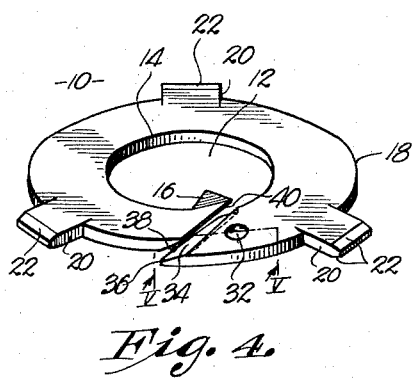
Fig. 4.
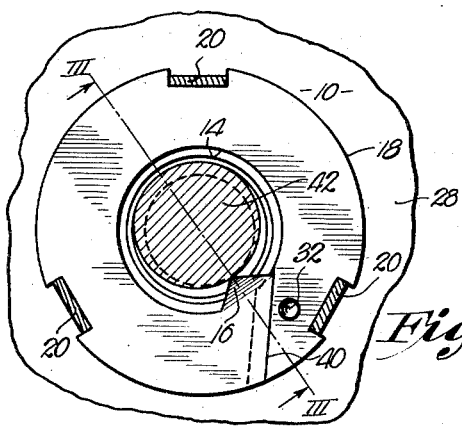
Fig. 2.
Fig. 5.
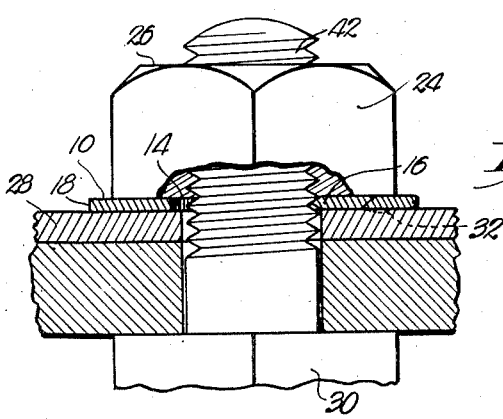
Fig. 3.
INVENTOR.
CHESTER A. BROOKS
BY
ATTORNEY.

Patented Dec. 12, 1950

2,533,916

UNITED STATES PATENT OFFICE 2,533,916

LOCK WASHER

Chester A. Brooks, Mission, Kans.

Application January 21, 1946, Serial No. 642,521

1 Claim. (Cl. 151—25)

This invention relates to lock washers of the character forming one unit of an assembly wherein is included a threaded bolt and nut therefor, and the primary aim is to provide such an article of manufacture that may be included with practically any type of nut and bolt assembly but which will function to maintain the elements thereof in place after they have been manipulated to their operative stations.

One of the most important objects of this invention is the provision of a lock washer having as an integral part thereof means for automatically directing a lug into engagement with the threads of a bolt about which the washer is encircled as the nut is threaded on to the bolt and into tight engagement with the washer.

A further aim of my invention is to provide a lock washer of the foregoing character that also embodies a number of nut engaging ears, the character whereof is such as to fully cooperate with the aforementioned lug in maintaining the bolt, the nut and the washer against accidental displacement.

Additional objects of the invention include the provision in a lock washer of means for holding one end of the split washer against radial movement as the opposite and overlapped end thereof is directed inwardly in response to pressure exerted by the tightening of a bolt beneath which the washer is placed; the provision of specially formed faces on the nut engaging ears for presenting tool engaging cavities when the ears are at either of two normal positions; and the provision of cooperating inwardly inclined faces on each of two ends of the strip of material from which the washer or split ring is made, that serve to positively direct a thread engaging lug radially inwardly as the nut is tightened along the threaded portion of the bolt.

Further aims of the invention will appear during the course of the following specification referring to the accompanying drawing, wherein:

Fig. 1 is a side elevational view of a bolt, nut and lock washer assembly having the lock washer made in accordance with my invention included therein.

Fig. 2 is a cross sectional view taken on line II—II of Fig. 1.

Fig. 3 is a cross sectional view taken on line III—III of Fig. 2.

Fig. 4 is a perspective view of the lock washer per se illustrating the same entirely removed from the aforesaid assembly, and Fig. 5 is a detailed fragmentary sectional view through a portion of the lock washer taken on line V—V of Fig. 4.

The art of providing lock washers for assemblies of the character illustrated in Fig. 1 of the accompanying drawing is extensive and much effort has been expended to provide an adequate locking mechanism in the form of a washer but much remains to be accomplished before a commercially satisfactory article is available.

The lock washer chosen for illustration embodies my invention and comprises a split ring-shaped body broadly designated by the numeral 10 and forming an opening 12 bounded by an inner edge 14 from which a lug 16 is projected radially inwardly. This lug 16 is adjacent to one end of the flat strip of material from which split ring 10 is formed and this one end overlies the opposite end of the strip when the split ring is complete and ready for use, as shown in Fig. 4. The outer periphery of ring 10 is defined by edge 18 and from this edge there is projected a number of initially flat radial ears 20, the free ends whereof are beveled on each face as at 22 to provide tool engaging cavities adjacent to each inclined face 22 when the ears are in the position illustrated in Fig. 1 where they lie against flats 24 of nut 26 or when the ears are in the position shown in Fig. 4, where they lie upon a member 28 with which the bolt 30 is associated.

A detent 32, pressed into ring 10 near the end thereof opposite to the end of the ring having lug 16, is sharp enough to engage or grip any underlying part such as member 28 to preclude undesirable outward shifting of the under end of ring 10 when nut 26 is tightened. The end of ring 10 adjacent to detent 32 is formed with an inclined face 34 which slopes downwardly and outwardly toward the free end 36 of ring 10 and also downwardly and inwardly from the outer periphery 18 to the inner periphery 14. A complementary and cooperating inclined face 38 on the overlying end of ring 10 moves into engagement with face 34 when nut 26 is tightened. This face 38 is inclined upwardly and outwardly as the end 40 is approached and is also inclined inwardly and downwardly as edge 14 is approached from edge 18. In describing these two faces 34 and 38, it is considered that ring 10 is in a normal position substantially horizontally disposed and as viewed in Fig. 1 of the drawing. These two cooperating faces 34 and 38 are positioned on a line extending substantially tangentially to edge 14 forming opening 12 and pass between lug 16 and the outer edge 18 of ring 10. The distance between the inner edge of lug 16 and any point on the remaining portion of edge 14 is greater than the outside diameter of the threaded portion 42 of bolt 30 and when ring 10 is in its initial position, it may be slid over the threaded portion 32 of bolt 30 without interference or restriction. When nut 26 is moved down against the normally upper face of ring 10, the overlying end of the ring upon the lower side whereof inclined face 38 is formed, will move down against the underlying end of ring 10 upon the upper face whereof surface 34 is created.

The angle of inclination of these inclined faces 34 and 36 causes lug 16 to move radially inwardly and into engagement with the threads on threaded portion 42 of bolt 30 exactly as illustrated in Fig. 3.

The inherent resiliency of the material from which ring 10 is constructed will establish a considerable amount of friction between the inner end of nut 24 and the opposed surface of any member 28 to prevent to a considerable degree accidental displacement of any part of the assembly. Such force, however, has been proven inadequate and therefore the provision of lug 16 to supplement this force is advantageous and capable of obtaining the results desired. After nut 26 has been forced to its final tightened position, one or more of ears 20 are bent to a position perpendicular with the major plane of ring 10 and against the adjacent flat 24 of nut 26. In performing this duty of bending ears 20 a tool is introduced beneath the appropriate inclined face 22 at the free end of each ear to establish an initial break across the line of bend. Thereafter a hammer may be used to force the ears against the flat 24. If it becomes necessary to disassemble the group of elements, a tool may be introduced between a flat 24 and one of the inclined faces 22 of the ear 20 to bend the same outwardly far enough to be struck and forced back to its original position to allow turning of nut 26.

When lug 16 is forced inwardly by the squeezing action of nut 26 detent 32 anchors the end of ring 10 whereon the inclined face 34 is established. Only lug 16 and the end of ring 10 whereon the same is created will shift radially toward the threads on bolt 30. The angle at which inclined faces 34 and 38 are disposed is quite important for not only is there a relatively long surface on each inclined portion 34 and 38 when placed as clearly shown in Fig. 2, but a shorter and adequately abrupt incline may be presented to insure positive shifting of lug 16.

Lock washers embodying the features of the invention may be made to accommodate bolts of various sizes and the material from which the washer is constructed may vary in strength and resiliency to meet stress in the particular job that must be performed.

Having thus described the invention, what is claimed as new and desired to be secured by Letters Patent is:

A lock washer for use with threaded bolts and nuts, said lock washer comprising a split ring having an opening to receive the threaded portion of said bolt; a lug integral with said split ring adjacent one end thereof and extending inwardly from the innermost edge of the split ring into said opening; complementary, opposed, overlapping faces at the ends of said split ring, said faces being elongated, the longitudinal axes of said faces being disposed tangentially to said opening and being beveled transversely only and throughout the length thereof for moving said lug into the threads of said bolt along a path of travel perpendicular to said axes as said faces are forced together during application of said nut; and detent structure on said split ring disposed to preclude shifting of the opposite end thereof as the lug is forced into said threads.

CHESTER A. BROOKS.

REFERENCES CITED

The following references are of record in the file of this patent:

UNITED STATES PATENTS

| Number | Name | Date |
|---|---|---|
| 516,501 | Mauermann | Mar. 13, 1894 |
| 732,166 | Callahan | June 30, 1903 |
| 778,537 | Fewget | Dec. 27, 1904 |
| 850,665 | Marsch | Apr. 16, 1907 |
| 859,785 | Steel | July 9, 1907 |
| 1,350,404 | Ettler | Aug. 24, 1920 |

FOREIGN PATENTS

| Number | Country | Date |
|---|---|---|
| 20,591 | Great Britain | 1892 |
| 489,221 | Germany | Jan. 15, 1930 |